United States Patent [19]
Williams

[11] Patent Number: 5,902,205
[45] Date of Patent: May 11, 1999

[54] FULL-TIME TRANSFER CASE WITH INTEGRATED PLANETARY GEARSET AND BIASING CLUTCH

[75] Inventor: Randolph C. Williams, Weedsport, N.Y.

[73] Assignee: New Venture Gear, Inc., Troy, Mich.

[21] Appl. No.: 08/990,306

[22] Filed: Dec. 15, 1997

[51] Int. Cl.[6] .................................................. B60K 17/35
[52] U.S. Cl. ...................... 475/204; 475/206; 180/248; 180/250
[58] Field of Search ................................. 475/204, 205, 475/206; 180/247, 248, 249, 250

[56] References Cited

U.S. PATENT DOCUMENTS

| | | |
|---|---|---|
| 4,569,252 | 2/1986 | Harper . |
| 4,677,873 | 7/1987 | Eastman et al. ........................ 475/204 |
| 4,770,280 | 9/1988 | Frost . |
| 4,804,061 | 2/1989 | Kameda ................................. 180/247 |
| 5,046,998 | 9/1991 | Frost ................................. 475/204 X |
| 5,054,335 | 10/1991 | Andrews . |
| 5,092,188 | 3/1992 | Fujikawa et al. ................... 180/249 X |
| 5,105,902 | 4/1992 | Wilson et al. . |
| 5,284,068 | 2/1994 | Frost . |
| 5,346,442 | 9/1994 | Eastman . |
| 5,655,986 | 8/1997 | Wilson et al. ........................... 475/204 |
| 5,700,222 | 12/1997 | Bowen ................................... 475/204 |
| 5,702,321 | 12/1997 | Bakowski et al. .................. 180/249 X |
| 5,704,866 | 1/1998 | Pritchard et al. ....................... 475/206 |
| 5,704,867 | 1/1998 | Bowen ................................... 475/205 |

*Primary Examiner*—Charles A. Marmor
*Assistant Examiner*—Scott Lund
*Attorney, Agent, or Firm*—Harness, Dickey & Pierce, P.L.C.

[57] ABSTRACT

A transfer case for a four-wheel drive vehicle having a planetary gear assembly which integrates a gear reduction unit and an interaxle differential into a common assembly. A synchronized range clutch is operably associated with the input to the planetary gear assembly and can be selectively shifted on-the-fly for establishing high-range and low-range speed ratios. A biasing clutch is operably associated with the output of the planetary gear assembly to automatically limit speed differentiation and bias the torque distribution between the outputs of the planetary gear assembly in response to excessive wheel slip.

21 Claims, 3 Drawing Sheets

FULL-TIME TRANSFER CASE WITH INTEGRATED PLANETARY GEARSET AND BIASING CLUTCH

BACKGROUND OF THE INVENTION

The present invention relates generally to transfer cases for use in four-wheel drive vehicles. More particularly, the present invention relates to a full-time transfer case having a two-speed gear reduction unit and an interaxle differential integrated into a planetary gear assembly, a synchronized range shift mechanism for shifting the input of the planetary gear assembly on-the-fly between high-range and low-range drive modes, and a biasing clutch for limiting slip between the outputs of the planetary gear assembly.

As is now conventional, many light-duty and sport-utility vehicles are equipped with a transfer case for transmitting power (i.e., drive torque) to all four of the wheels, thereby establishing a four-wheel drive mode of operation. To accommodate differing road surfaces and conditions, many transfer cases are equipped with a gear reduction unit which can be selectively shifted to permit the vehicle operator to choose between a four-wheel high-range (i.e., direct ratio) drive mode and a four-wheel low-range (i.e., reduced ratio) drive mode. In many instances, the four-wheel drive vehicle must be stopped before the transfer case can be shifted between its four-wheel high-range and low-range drive modes. Unfortunately, the need to stop the vehicle prior to shifting between the available four-wheel high-range and low-range drive modes is inconvenient, particularly upon encountering road conditions or surface terrains where continuation of the vehicle's rolling momentum would assist in overcoming the conditions encountered. To alleviate a portion of this inconvenience, some gear reduction units have been designed which permit the vehicle operator to shift without stopping the vehicle (i.e., "on-the-fly") from the four-wheel low-range drive mode into the four-wheel high-range drive mode. For example, U.S. Pat. No. 5,054,335 discloses a transfer case equipped with a synchronized range shift arrangement for "on-the-fly" shifting of a layshaft-type gear reduction unit. Alternatively, commonly-owned U.S. Pat. No. 5,346,442 discloses a transfer case having a synchronized range shift arrangement for "on-the-fly" shifting of a planetary-type gear reduction unit. Finally, U.S. Pat. No. 4,569,252 discloses a planetary-type gear reduction unit which permits synchronized shifting into and out of the high-range drive mode and the low-range drive mode.

In addition to the gear reduction unit, many transfer cases are also equipped with a mode shift mechanism which permits the vehicle operator to selectively shift between a two-wheel drive mode wherein only the rear driveline is driven and a "part-time" four-wheel drive mode wherein the front driveline is rigidly coupled for rotation with the rear driveline. Reference may be made to commonly-owned U.S. Pat. No. 4,770,280 for disclosure of an exemplary part-time transfer case equipped with a gear reduction unit and a synchronized mode shift mechanism. In view of increased consumer popularity in four-wheel drive vehicles for everyday use, the mode shift mechanism in some two-speed transfer cases is replaced with an interaxle differential which is operable for continuously transmitting drive torque to both the front and rear drivelines while permitting speed differentiation therebetween. Reference may be made to commonly-owned U.S. Pat. No. 4,677,873 for disclosure of an exemplary full-time two-speed transfer case equipped with a gear reduction unit and a dual-planetary interaxle differential. In order to prevent traction loss due to excessive interaxle slip, some full-time transfer cases are also equipped with a limited slip device which is operable for selectively or automatically biasing the torque distribution ratio across the interaxle differential while preventing or regulating speed differentiation in response to the slip condition. In some systems, a lock-out clutch is manually-actuated to lock the interaxle differential. However, other full-time transfer cases are equipped with a hydraulic coupling or an electronically-controlled bias clutch for automatically regulating the amount of allowable speed differentiation across the interaxle differential.

In an effort to minimize the overall size of full-time transfer cases, it has been proposed to incorporate the gear reduction unit and the interaxle differential into a common planetary gear assembly. One such arrangement is described in U.S. Pat. No. 4,644,822 which discloses a transfer case having "back-to-back" first and second planetary gearsets with common components that can be selectively shifted to establish different four-wheel drive modes. Likewise, each of commonly-owned U.S. Pat. Nos. 5,284,068 and 5,411,447 discloses a full-time dual-speed transfer case equipped with an integrated planetary gear assembly that is shifted as a unit to establish the different available drive modes. Finally, U.S. Pat. Nos. 4,677,875, 4,344,335, 4,215,593 and 4,805,484 each disclose a transfer case having a common planetary gear assembly which is operable to establish various drive modes through manipulation of one or more suitable shift mechanisms. While such prior art arrangements provide a compact construction, there is a continuing need to develop low cost, simplified alternatives which meet modern requirements for low noise and weight.

SUMMARY OF THE INVENTION

It is therefore an object of the present invention to provide a transfer case for a full-time four-wheel drive vehicle having a planetary gear assembly which integrates a gear reduction unit and an interaxle differential into a common arrangement.

As an additional object, the transfer case includes a range shift mechanism which is operably associated with the input of the planetary gear assembly and which can be selectively actuated for establishing a full-time four-wheel high-range drive mode, a neutral mode, and a full-time four-wheel low-range drive mode.

As a related object of the present invention, a synchronized range shift mechanism is provided for permitting "on-the-fly" shifting of the transfer case between the full-time four-wheel high-range and low-range drive modes.

According to another object of the present invention, the transfer case includes a biasing clutch which is operably associated with the outputs of the planetary gear assembly for limiting speed differentiation and regulating the torque distribution therebetween in response to the occurrence of slip between the front and rear output shafts of the transfer case.

According to a preferred embodiment of the present invention, the planetary gear assembly is operably installed between an input shaft and front and rear output shafts of the transfer case and is constructed in a compact arrangement. The planetary gear assembly includes a first planetary gearset and a second planetary gearset which are interconnected by a common carrier assembly. The first planetary gearset is operably installed between the input shaft and the second planetary gearset for driving the carrier assembly at either of a first speed ratio (i.e., "high-range") or a second speed ratio (i.e., "low-range") relative to the input shaft. The common carrier assembly acts as the input to the second planetary gearset which has first and second outputs respectively connected to the rear and front output shafts of the transfer case. Thus, the second planetary gearset is operable for permitting speed differentiation and distributing drive torque between the front and rear output shafts of the transfer case. A synchronized range shift mechanism is provided which includes a range clutch operable in a first range position for coupling the input shaft to a first component of the first planetary gearset for establishing the four-wheel high-range drive mode. The range clutch is operable in a second range position for coupling the input shaft to a second component of the first planetary gearset for establishing the four-wheel low-range drive mode. Finally, the range clutch is operable in a third range position to disconnect the input shaft from the first and second components of the first planetary gearset for establishing a Neutral mode.

As an additional feature, the transfer case further includes a biasing clutch having a clutch pack with a first set of clutch plates fixed for rotation with the front output shaft and a second set of clutch plates fixed for rotation with the rear output shaft. During normal driving conditions, the biasing clutch permits uninhibited speed differentiation between the front and rear output shafts. When an excessive slip condition occurs, the biasing clutch transfers torque to the slower rotating output shaft, thereby regulating the amount of speed differentiation between the front and rear output shafts.

Additional objects, features and advantages of the present invention will become apparent from studying the following detailed description and appended claims when taken in conjunction with the accompanying drawings.

DETAILED DESCRIPTION OF THE PREFERRED EMBODIMENTS

In general, the present invention relates to the combination of a gear reduction unit and an interaxle differential in an "integrated" planetary gear assembly. Preferably, the integrated planetary gear assembly is installed in the transfer case of a four-wheel drive motor vehicle for establishing several different combinations of speed ranges and drive modes. A synchronized range shift mechanism is operably associated with the input of the integrated planetary gear assembly for permitting "on-the-fly" shifting of the transfer case between a low-range speed ratio and a high-range speed ratio during motive operation of the motor vehicle. Additionally, a biasing clutch is operably associated with the outputs of the integrated planetary gear assembly for regulating the torque distribution and relative rotation therebetween as a function of interaxle slip.

Figures 1, 2:
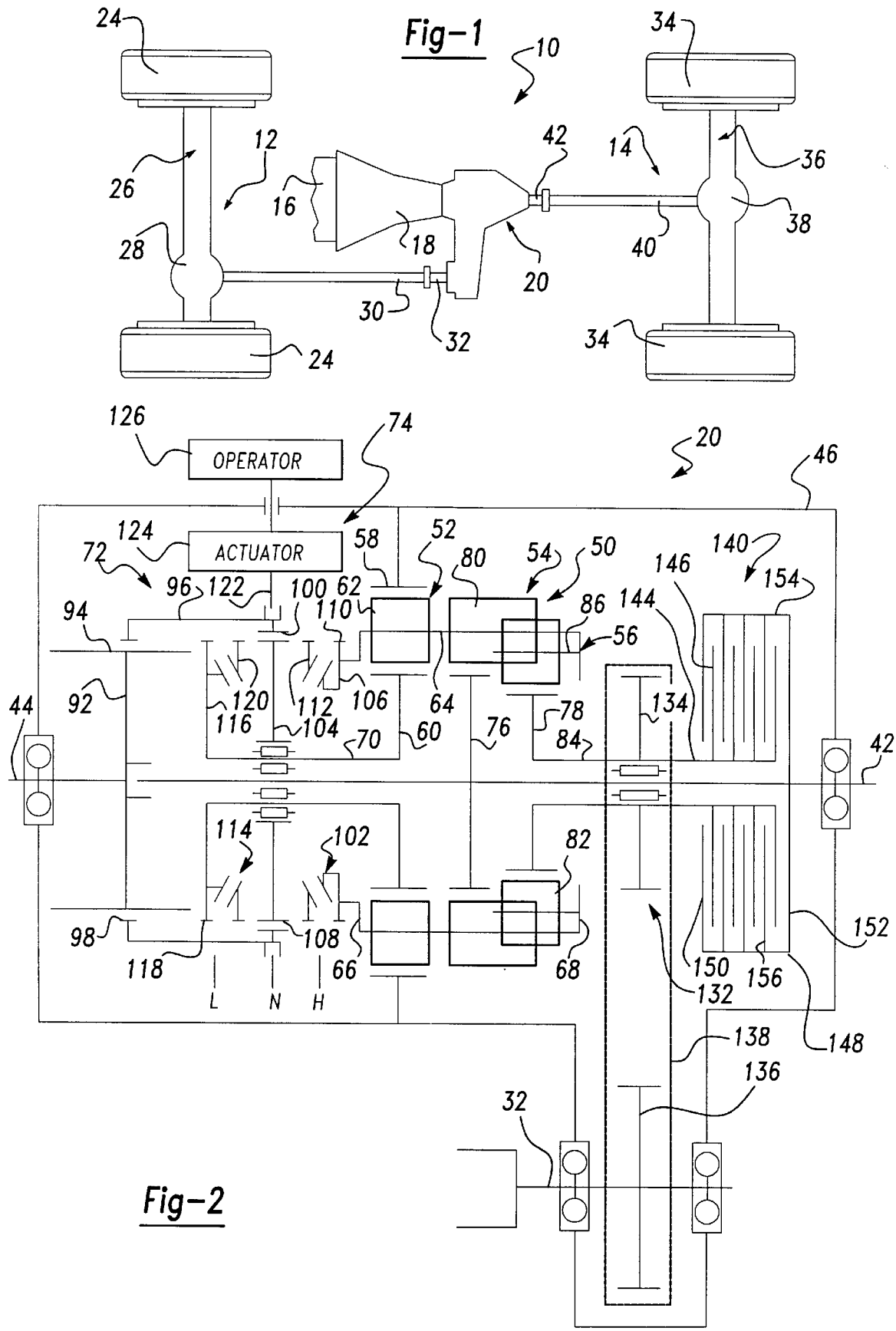
FIG. 1 illustrates the drivetrain of a four-wheel drive motor vehicle equipped with the transfer case of the present invention.
FIG. 2 is a schematic drawing of the transfer case of the present invention.

With particular reference to FIG. 1 of the drawings, a drivetrain 10 for a four-wheel drive vehicle is shown. Drivetrain 10 includes a front driveline 12 and a rear driveline 14 both drivable from a source of power, such as an engine 16, through a transmission 18 which may be of either the manual or automatic type. In the particular embodiment shown, drivetrain 10 is an full-time four-wheel drive system which incorporates a transfer case 20 for transmitting drive torque from engine 16 and transmission 18 to front driveline 12 and rear driveline 14. Front driveline 12 is shown to include a pair of front wheels 24 connected at opposite ends of a front axle assembly 26 having a front differential 28 that is coupled to one end of a front propshaft 30, the opposite end of which is coupled to a front output shaft 32 of transfer case 20. Similarly, rear driveline 14 includes a pair or rear wheels 34 connected at opposite ends of a rear axle assembly 36 having a rear differential 38 coupled to one end of a rear propshaft 40, the opposite end of which is interconnected to a rear output shaft 42 of transfer case 20.

With particular reference to FIG. 2 of the drawings, transfer case 20 is schematically shown to include an input shaft 44 which is rotatably supported in a housing 46. Input shaft 44 is adapted for connection to an output shaft (not shown) of transmission 18 such that both are rotatably driven by engine 16 of the motor vehicle. Likewise, front output shaft 32 and rear output shaft 42 are rotatably supported in housing 46. Transfer case 20 is also shown to include a planetary gear assembly 50 which is operably installed between input shaft 44 and front and rear output shafts 32 and 42, respectively. Planetary gear assembly 50 includes a first gearset 52 and a second gearset 54 interconnected by a common carrier assembly 56. First gearset 52 is a simple planetary gear assembly including a ring gear 58 fixed to housing 46, a first sun gear 60, and a set of first pinion gears 62 which are each rotatably supported on a pinion shaft 64 and meshed with sun gear 60 and ring gear 58. Each pinion shaft 64 extends between a front carrier ring 66 and a rear carrier ring 68 which are interconnected to define carrier assembly 56. First sun gear 60 is fixed to a quill shaft 70 rotatably supported on rear output shaft 42.

As will be detailed hereinafter, first gearset 52 functions as a two-speed gear reduction unit which, in conjunction with a range clutch 72 of a synchronized range shift mechanism 74, is operable to establish a first or high-range speed ratio drive connection between input shaft 44 and carrier assembly 56 by directly coupling input shaft 44 to front carrier ring 66 of carrier assembly 56. Likewise, a second or low-range speed ratio drive connection is established by range clutch 72 between input shaft 44 and carrier assembly 56 by coupling input shaft 44 to first sun gear 60. A Neutral mode is established when input shaft 44 is uncoupled for both carrier assembly 56 and first sun gear 60.

With continued reference to FIG. 2, second gearset 54 is shown as a dual-planetary gear assembly which functions as an interaxle differential to permit speed differentiation and distribute drive torque between front output shaft 32 and rear output shaft 42. As will be detailed, carrier assembly 56, when driven at either of the high-range or low-range speed ratios, acts as the input of second gearset 54 and which has its outputs coupled to front output shaft 32 and rear output shaft 42. In particular, second gearset 54 includes a second sun gear 76, a third sun gear 78, a set of full-length or second pinion gears 80 each meshed with second sun gear 76, and a set of half-length or third pinion gears 82 each meshed with a corresponding one of second pinion gears 80 as well as with third sun gear 78. According to the embodiment shown, second sun gear 76 acts as a first output of second gearset 54 and is fixed for rotation with rear output shaft 42. Likewise, third sun gear 78 acts as a second output of second gearset 54 and is fixed to a transfer shaft 84 which is supported for rotation relative to rear output shaft 42. In addition, each second pinion gear 80 is rotatably supported on pinion shaft 64, the opposite ends of which are, as noted, mounted in front and rear carrier rings 66 and 68, respectively, of carrier assembly 56. Similarly, each third pinion gear 82 is rotatably supported on a pinion shaft 86, the opposite end of which are likewise mounted in front and rear carrier rings 66 and 68, respectively. According to the preferred embodiment, first sun gear 60 and second sun gear 76 have their gear teeth located at a first radial distance from the principle axis shared by rear output shaft 42 and input shaft 44, while the gear teeth of third sun gear 78 are located at a second lesser radial distance relative to the principle axis.

To provide means for selectively establishing the high-range and low-range drive connections between input shaft 44 and carrier assembly 56, synchronized range shift mechanism 74 is provided in conjunction with first gearset 52. As noted, synchronized range shift mechanism 74 is operable for permitting transfer case 20 to be shifted "on-the-fly" between its high-range and low-range drive modes. As also noted previously, synchronized range shift mechanism 74 includes range clutch 72 which is operable for selectively coupling input shaft 44 to either of carrier assembly 56 or first sun gear 60. In particular, range clutch 72 includes a drive gear or hub 92 that is fixed to input shaft 44. Drive hub 92 has an outer cylindrical rim on which external gear teeth or longitudinal splines 94 are formed. Range clutch 72 further includes a range sleeve 96 having a first set of internal splines 98 that are in constant mesh with external splines 94 on drive hub 92. Thus, range sleeve 96 is mounted for rotation with and axial sliding movement on drive hub 92 such that driven rotation of input shaft 44 causes concurrent rotation of range sleeve 96. Range sleeve 96 is shown to also include a second set of internal splines 100 which are offset axially from the first set of internal splines 98.

Range clutch 72 also includes a first synchronizer assembly 102 operably located between a neutral hub 104 rotatably supported on quill shaft 70 and a first clutch plate 106 which is fixed to front carrier ring 66 of carrier assembly 56. Neutral hub 104 has extended splines 108 formed thereon while first clutch plate 106 has external clutch teeth 110 formed thereon. First synchronizer assembly 102 is operable for causing speed synchronization between input shaft 44 and carrier assembly 56 in response to movement of range sleeve 96 from a neutral position (denoted by position line "N") shown toward a high-range position (denoted by position line "H"). Once the speed synchronization process is completed, range sleeve 96 is permitted to move through a blocker ring 112 and into coupled engagement with first clutch plate 106 such that its splines 100 meshingly engage clutch teeth 110 on first clutch plate 106. Accordingly, with range sleeve 96 positioned in its H position, drive hub 92 is drivingly coupled to first clutch plate 106 such that carrier assembly 56 is coupled to rotate at the same speed as input shaft 44 for establishing the high-range drive connection.

Range clutch apparatus 72 further includes a second synchronizer assembly 114 operably disposed between neutral hub 104 and a second clutch plate 116 which is fixed to quill shaft 70 and has external clutch teeth 118 formed thereon. Second synchronizer assembly 114 is operable for causing speed synchronization between first sun gear 60 and input shaft 44 in response to movement of range sleeve 96 from its N position toward a low-range position (denoted by position line "L"). Once speed synchronization is complete, range sleeve 96 is permitted to move through a second blocker ring 120 and into coupled engagement with second clutch plate 116 such that its splines 100 meshingly engage clutch teeth 118 on second clutch plate 116 for establishing the low-range drive connection therebetween. With range sleeve 96 positioned in its L position, first sun gear 60 drives first pinion gears 62 about stationary ring gear 58 such that carrier assembly 56 is driven at a reduced speed ratio relative to input shaft 44, thereby establishing the low-range drive connection. While only schematically shown, first synchronizer assembly 102 and second synchronizer assembly 114 can be any conventional construction such as, for example, single-cone or dual-cone arrangements. Thus, it will be appreciated by those skilled in the art that any type of suitable synchronizer arrangement can be used for facilitating speed synchronization between the components that are to be directly coupled.

Range sleeve 96 is shown in its Neutral position (denoted by position line "N") whereat its splines 100 are released from engagement with clutch teeth 110 on first clutch plate 106 and clutch teeth 118 on second clutch plate 116 and yet are engaged with teeth 108 on neutral hub 104. As such, driven rotation of input shaft 44 causes rotation of range sleeve 96 and neutral hub 104 which, as noted, is rotatably supported on quill shaft 70. Since range sleeve 96 does not couple input shaft 44 to either of clutch plates 106 and 116 when it is in its N position, no drive torque is transferred through carrier assembly 56 to front and rear output shafts 32 and 42, respectively, thereby establishing the Neutral non-driven mode. While not intended to be scaled, FIG. 2 illustrates that splines 98 on range sleeve 96 maintain engagement with splines 94 on drive hub 92 throughout the entire length of axial travel of range sleeve 96 between its H and L positions. Moreover, splines 98 do not engage clutch teeth 118 on second clutch plate 116 when range sleeve 96 is in its H position.

With continued reference to FIG. 2, range shift mechanism 74 is shown to include a range fork 122 coupling range sleeve 96 to an actuator 124, and an operator 126 controlling selective actuation of actuator 124. Actuator 124 can be any suitable device operable for causing axial movement of range sleeve 96 in response to a particular drive mode selected by the vehicle operator moving operator 126. Preferably, actuator 124 is a sector plate having a cam surface causing bi-directional axial movement of range sleeve in response to bi-directional rotation of sector plate in a manner generally similar to that described in commonly-owned U.S. Pat. No. 5,076,112. Operator 126 can be any suitable manually-actuated (i.e., a linkage coupling actuator 124 to a gearshift lever) or power-actuated (i.e., a gearmotor connected to actuator 124 controlled by electric control signals from push-buttons or rotary switches) arrangements under the control of the vehicle operator.

As noted, second gearset 54 functions as the interaxle differential. Specifically, carrier assembly 56 is its input member while second sun gear 76 and third sun gear 78 are its output members. Thus, driven rotation of carrier assembly 56 via coupled engagement of range sleeve 96 with either carrier assembly 56 or first sun gear 60 causes a predetermined torque split (i.e., distribution ratio) to be transmitted to rear output shaft 42 through second sun gear 76 and to transfer shaft 84 through third sun gear 78. As seen, a transfer assembly 132 is provided for transferring drive torque from transfer shaft 84 to front output shaft 32. Transfer assembly 132 includes a drive sprocket 134 fixed to transfer shaft 84, a driven sprocket 136 fixed to front output shaft 32, and a continuous chain 138 interconnecting driven sprocket 136 to drive sprocket 134.

To provide means for controlling torque distribution and speed differentiation between front and rear output shafts 32 and 42, respectively, transfer case 20 includes a biasing clutch 140. Biasing clutch 140 is normally operable in a non-actuated mode for permitting speed differentiation between front output shaft 32 and rear output shaft 42, thereby establishing the "full-time" (i.e, differentiated) four-wheel drive mode. Biasing clutch 140 is also operable in a fully-actuated mode for establishing a "locked" (i.e., non-differentiated) four-wheel drive mode in which speed differentiation is inhibited between front output shaft 32 and rear output shaft 42. Biasing clutch 140 is, in the embodiment shown in FIG. 2, a sealed torque transfer device, such as a viscous coupling or a geared traction unit which can progressively regulate the torque bias and speed differentiation automatically (i.e., on-demand) between its non-actuated and fully-actuated modes in response to and as a function of the amount of relative rotation (i.e., interaxle slip) between front output shaft 32 and rear output shaft 42. The torque versus slip characteristics of biasing clutch 140 can be tuned to meet specific vehicular applications.

Biasing clutch 140 includes an inner hub 144 fixed to transfer shaft 84 and to which a set of inner clutch plates 146 are fixed. Biasing clutch 140 also includes a drum assembly 148 comprised of front and rear end plates 150 and 152, respectively, which are sealed relative to inner hub 144 and a drum 154 to which end plates 150 and 152 are secured. Drum 154 is cylindrical and has a set of outer clutch plates 156 fixed thereto which are alternately interleaved with inner clutch plate 146 to define a multi-plate clutch pack. The pressure chambers defined between inner hub 144 and drum assembly 148 is filled with a predetermined volume of a viscous fluid which causes torque to be delivered to the slower rotating set of clutch plates due to the relative rotation therebetween in a know manner.

Figure 3:
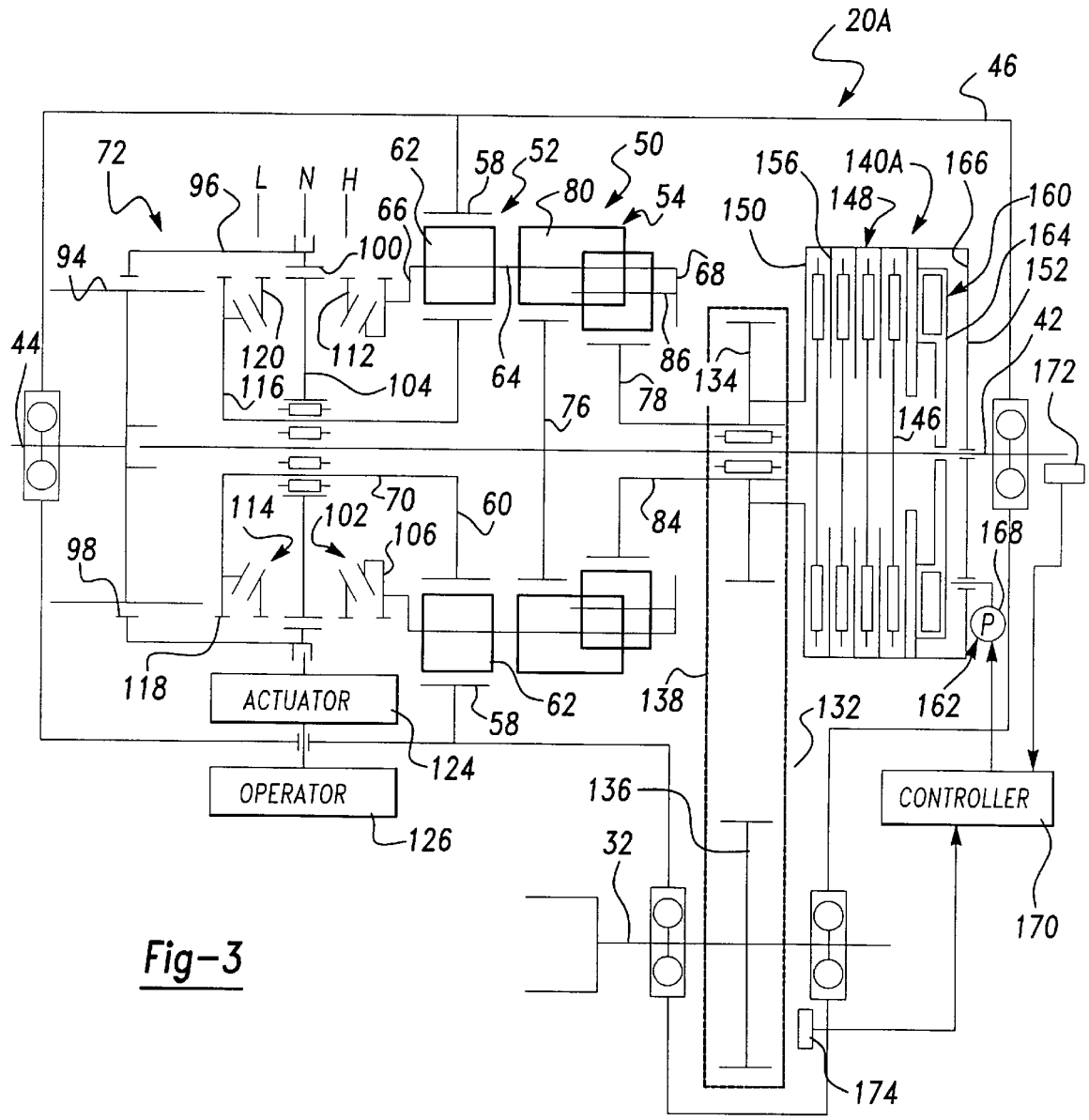
FIG. 3 is a schematic drawing of a modified version of the transfer case shown in FIG. 2.

FIG. 3 illustrates a transfer case 20A which is a modified version of transfer case 20. In particular, transfer case 20A is equipped with a biasing clutch 140A having a set of outer clutch plates 156 fixed to drum assembly 148 which is fixed for rotation with drive sprocket 134, and a set of inner clutch plates 146 fixed for rotation with rear output shaft 42 alternatively interleaved with outer clutch plates 156 to define a clutch pack. Biasing clutch 140A further includes a thrust mechanism 160 for exerting a clutch engagement force on the clutch pack and an actuator 162 for controlling the magnitude of the clutch engagement force as a function of the amount of interaxle slip. In particular, thrust mechanism 160 includes a piston 164 which is axially movable within a pressure chamber 166 of biasing clutch 140A for movement relative to the clutch pack. As shown, actuator 162 is a pump 168 which supplies high pressure hydraulic fluid from a sump to pressure chamber 166 for controlling the axial position of piston 164 relative to the clutch pack and, as such, the clutch engagement force exerted thereon. Pump 168 can be a shaft driven device, such as a gerotor pump or a gear pump, in which the output pressure generated and supplied to pressure chamber 166 is proportional to the speed difference between front output shaft 32 and rear output shaft 42. With such a shaft-driven pump 168, the position of piston 164 in pressure chamber 166 and the clutch engagement force exerted on the clutch pack is progressive and is likewise generally proportional to the speed difference between output shafts 32 and 42. Alternatively, the output pressure generated by pump 168 can be adaptively controlled using a control system having a controller 170 which receives input signals from a rear speed sensor 172 and a front speed sensor 174. Controller 170 determines the real time value of the speed difference from the sensor signals supplied by speed sensors 172 and 174 and sends a control signal to pump 168 which regulates its output pressure as a function of the speed difference.

Controller 170 can be programmed to control actuation of biasing clutch 140A pursuant to an ON/Off control scheme. In such an arrangement, biasing clutch 140A is normally maintained in an non-actuated state to permit speed differentiation between front and rear output shafts 32 and 42, respectively. In this state, transfer case 20A is defined as operating in its full-time four-wheel drive mode. However, when the sensor input signals indicate a vehicular condition exceeding a predetermined value, biasing clutch 140A is fully actuated for "locking" front and rear output shafts 32 and 42 against relative rotation whereby they are, in effect, rigidly coupled for establishing the locked four-wheel drive mode. Preferably, the vehicular condition used for controlling actuation of biasing clutch 140A is the speed differential between front output shaft 32 and rear output shaft 42. Thereafter, biasing clutch 140A is returned to its non-actuated state when the sensor input signals indicate that the magnitude of the vehicular condition is less than a predetermined value. Alternatively, controller 170 can be programmed in accordance with an ADAPTIVE control scheme to regulate the actuated condition of biasing clutch 140A between its non-actuated and fully-actuated limits for varying the magnitude of speed differentiation and drive torque transmitted across planetary gear assembly 50 as a function of the sensor input signals. In operation, biasing clutch 140A increases the amount of drive torque delivered to the slower turning output shaft while concurrently decreasing the drive torque delivered to the faster turning output shaft in an amount equal to the torque capacity of the clutch at a given actuated state. In either of the above-noted control schemes, control over actuation of biasing clutch 140A is automatic and does not require any act or mode selection on the part of the vehicle operator. Under both control schemes, the process of monitoring vehicle conditions and controlling clutch engagement is continuous and automatic.

Figure 4:
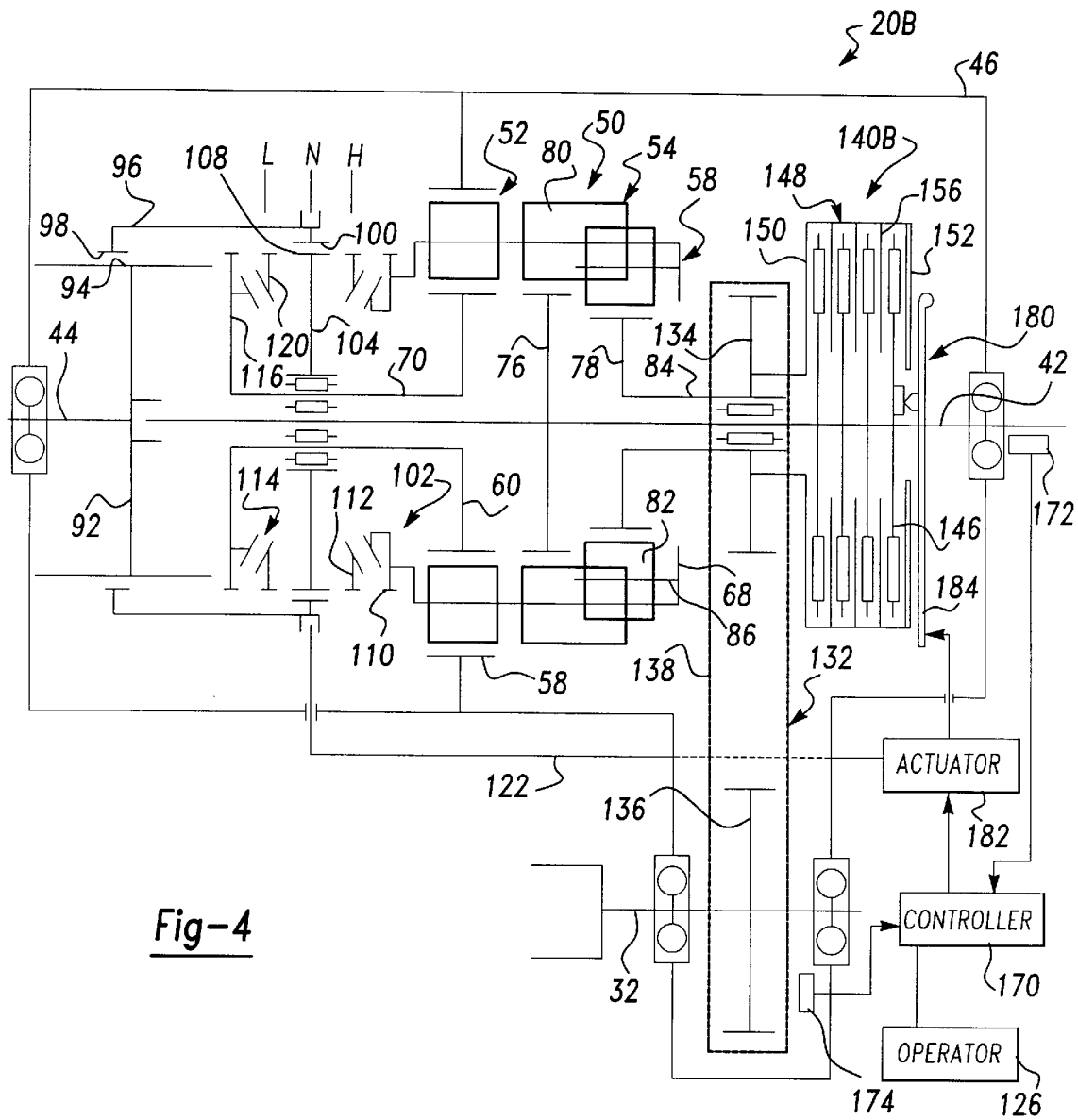
FIG. 4 is a schematic drawing of another modified version of the transfer case.

FIG. 4 illustrates a transfer case 20B equipped with a mechanically-actuated biasing clutch 140B. In particular, biasing clutch 140B is an electronically-controlled clutch assembly operably disposed between front output shaft 32 and rear output shaft 42 to automatically control the magnitude of the speed differentiation and modify the torque distribution ratio therebetween. Biasing clutch 140B has a thrust mechanism 180 for exerting a clutch engagement force on the clutch pack with an actuator 182 controlling the magnitude of the clutch engagement force as a function of the value of interaxle slip. In particular, thrust mechanism 180 includes a pivotable lever arm assembly 184. Again, controller 170 controls the frictional biasing applied by biasing clutch 140B in response to a control signal generated based on the value of the sensor input signals. Preferably, actuator 182 is a sector plate having a range shift arrangement similar to actuator 124 in FIG. 2 but modified to include a second cam surface for controlling pivotal movement of lever arm assembly 182. The cam surfaces can be arranged to facilitate coordinated movement of range sleeve 96 and lever arm assembly 182 to permit the vehicle operator to select, via actuation of operator 126, full-time four-wheel high-range and low-range drive modes, a neutral mode, and locked four-wheel high-range and low-range drive modes. In the full-time four-wheel drive modes, biasing clutch 140B is controlled automatically under either of the ON/OFF or ADAPTIVE schemes. When one of the locked four-wheel drive modes is selected, biasing clutch 140B is held in its fully-actuated state. Obviously, the mode selections described above can also be made available with biasing clutch 140A of transfer case 20A (shown in FIG. 3) if operator 126 supplies controller 170 with a signal indicating the particular mode selected.

Figure 5:
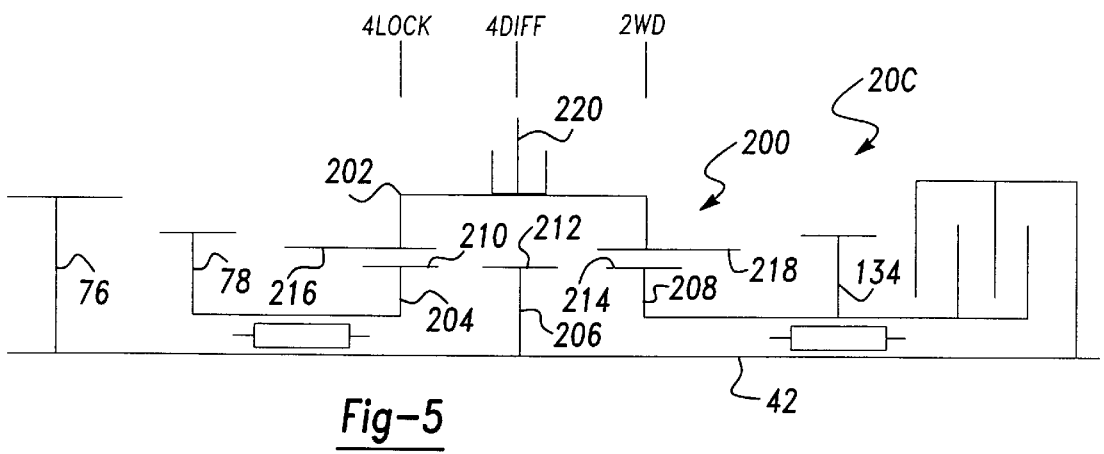
FIG. 5 is a partial schematic of a mode shift mechanism for use with the transfer cases of the present invention.

Referring now to FIG. 5, a transfer case 20C is partially shown to be equipped with a mode shift mechanism 200 including a mode sleeve 202 movable between three positions to establish three different drive connections between second gearset 54 and front and rear output shafts 32 and 42, respectively. In particular, mode shift mechanism 200 includes a first clutch plate 204 fixed to third sun gear 78, a second clutch plate 206 fixed to second sun gear 76, and a third clutch plate 208 fixed to transfer shaft 84. First clutch plate 204 has external clutch teeth 210, second clutch plate 206 has external clutch teeth 212, and third clutch plate 208 has external clutch teeth 214. Mode sleeve 202 is shown to include a first set of internal splines 216 which are axially offset from a second set of internal splines 218. In FIG. 5, mode sleeve 202 is shown in a first or full-time four-wheel drive mode position (denoted by position line "4DIFF") whereat its first set of spline teeth 216 are in meshed engagement with clutch teeth 210 on first clutch plate 204 and its second set of spine teeth 218 are in meshed engagement with clutch teeth 214 on third clutch plate 208. In this mode position, transfer shaft 84 is coupled to third sun gear 78 such that driven rotation of carrier assembly 56 causes drive torque to be distributed between second sun gear 76 and third sun gear 78 and respectively to rear output shaft 42 and front output shaft 32 while permitting speed differentiation therebetween, thereby establishing the full-time four-wheel drive mode. Forward axial movement of mode sleeve 202 from its 4DIFF position to a second or locked four-wheel drive mode position (denoted by position line "4LOCK") maintains engagement of clutch teeth 214 on third clutch plate 208 with mode sleeve splines 218 and causes mode sleeve splines 218 to also engage clutch teeth 212 on second clutch plate 206. However, mode sleeve splines 216 disengage clutch teeth 210 on first clutch plate 204. In this mode position, relative rotation between transfer shaft 84 and rear output shaft 42 is prevented for likewise preventing relative rotation between rear output shaft 42 and front output shaft 32, thereby establishing the non-differentiated or locked four-wheel drive mode. In contrast, rearward axial movement of mode sleeve 202 from its 4DIFF mode position to a third or two-wheel drive mode position (denoted by position line "2WD") causes splines 218 on mode sleeve 202 to disengage clutch teeth 214 on third clutch plate 208 while mode sleeve splines 216 maintain engagement with clutch teeth 210 on first clutch plate 204 and move into engagement with clutch teeth 212 on second clutch plate 206. In this mode position, drive sprocket 134 and transfer shaft 84 are uncoupled from third sun gear 78 while relative rotation is prevented between second sun gear 76 and third sun gear 78, thereby transmitting all drive torque to rear output shaft 42 and establishing the two-wheel drive mode. Thus, in both of the 4LOCK and 2WD mode positions, second gearset 54 is locked-up for preventing speed differentiation. In a four-wheel drive vehicle equipped with a live front axle, mode sleeve can be shifted on-the-fly when the vehicle is travelling in a straight line since there is little, if any, relative rotation between front output shaft 32 and rear output shaft 42. A mode fork 220 coupled to an actuator, such as actuator 182 in FIG. 4, permits the vehicle operator to select operation of transfer case 20C in a particular drive mode via actuation of shift operator 126.

The combination of range positions of range sleeve 96 and mode positions of mode sleeve 202 establishes the various drive modes made available by transfer case 20C of FIG. 5. In particular, a two-wheel high-range drive mode is established with range sleeve 96 in its H position and mode sleeve 202 in its 2WD position. A full-time four-wheel high-range drive mode is established by shifting mode sleeve 202 to its 4DIFF position while range sleeve 96 is maintained in its H position. A locked four-wheel high-range drive mode is established by moving mode sleeve 202 to its 4LOCK position while range sleeve 96 again is maintained in its H position. A locked four-wheel low-range drive mode is established by maintaining mode sleeve 202 in its 4LOCK position while moving range sleeve 96 to its L position. A full-time four-wheel low-range drive mode is established by moving mode sleeve 202 to its 4DIFF position while range sleeve 96 is maintained in its L position. A two-wheel low-range drive mode is established by moving mode sleeve 202 to its 2WD position while range sleeve 96 is maintained in its L position. Finally, a Neutral mode is established by moving range sleeve 96 to its N position while mode sleeve 202 is maintained in its 2WD position. In the full-time four-wheel drive modes, torque biasing across second gearset 54 is automatic and on-demand via biasing clutch 140. While the above sequence of drive mode requires movement of only one of range sleeve 96 and mode sleeve 202 for selection of the next drive mode, the invention is not limited to such a sequence nor is it necessary that all seven of the drive modes be made available. In particular, the number of drive modes made available for selection via actuation of operator 126 can be selected based on the particular requirements of each different vehicular application.

The foregoing discussion discloses and describes various embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said front and rear output shafts for delivering drive torque from the power source to the front and rear drivelines while permitting speed differentiation therebetween, said planetary gear assembly including first and second planetary gearsets having a common carrier assembly, said first planetary gearset including a first sun gear, a ring gear fixed to said housing, and a first planet gear rotatably supported by said carrier assembly and meshed with said first sun gear and said ring gear, said second planetary gearset including a second sun gear fixed for rotation with said rear output shaft, a third sun gear fixed for rotation with said front output shaft, a second planet gear rotatably supported by said carrier assembly and meshed with said second sun gear, and a third planet gear rotatably supported by said carrier assembly and meshed with said third sun gear and said second planet gear;

a first clutch for selectively coupling said input shaft to said carrier assembly for driving said carrier assembly at a first speed ratio relative to said input shaft for establishing a high-range drive mode, and said first clutch is further operable for selectively coupling said input shaft to said first sun gear for driving said carrier assembly at a second speed ratio relative to said input shaft for establishing a low-range drive mode; and a second clutch operably disposed between said front and rear output shafts and which is normally operable for permitting relative rotation between said front and rear output shafts, said second clutch is further operable for limiting such relative rotation between said front and rear output shafts when a speed differential therebetween exceeds a predetermined value.

2. The transfer case of claim 1 wherein said first clutch is a synchronizer clutch operable for causing speed synchronization between said input shaft and said carrier assembly, and said synchronizer clutch is further operable for causing speed synchronization between said input shaft and said first sun gear.

3. The transfer case of claim 1 wherein said first clutch includes a range sleeve rotatably driven by said input shaft and movable from a neutral position to a high-range position and a low-range position, said range sleeve is operable in said high-range position to couple said carrier assembly with said input shaft and in said low-range position to couple said first sun gear with said input shaft, and said range sleeve is operable in said neutral position to uncouple said input shaft from both of said carrier assembly and said first sun gear for establishing a Neutral non-driven mode.

4. The transfer case of claim 3 wherein said first clutch includes a first synchronizer operably disposed between said carrier assembly and said input shaft for inhibiting movement of said range sleeve to said high-range position until speed synchronization is established therebetween, and a second synchronizer operably disposed between said first sun gear and said input shaft for inhibiting movement of said range sleeve to said low-range position until speed synchronization is established therebetween.

5. The transfer case of claim 4 wherein said first clutch includes a drive hub fixed for rotation with said input shaft and on which said range sleeve is supported for rotation therewith and sliding movement thereon between said high-range, low-range and neutral positions, a first clutch plate fixed to said carrier assembly, and a second clutch plate fixed to said first sun gear, wherein said first synchronizer is disposed between said drive hub and said first clutch plate for inhibiting movement of said range sleeve into said high-range position whereat said range sleeve is coupled to said first clutch plate until speed synchronization is established therebetween, and wherein said second synchronizer is disposed between said drive hub and said second clutch plate for inhibiting movement of said range sleeve to said low-range position whereat said range sleeve is coupled to said second clutch plate until speed synchronization is established therebetween.

6. The transfer case of claim 1 wherein said second clutch is a multi-plate clutch assembly having a first set of clutch plates fixed for rotation with said rear output shaft, a second set of clutch plates fixed for rotation with said front output shaft and which are interleaved with said first set of clutch plates, and means for transferring drive torque from faster rotating clutch plates to slower rotating clutch plates in response to said speed differential exceeding said predetermined value.

7. The transfer case of claim 6 wherein said second clutch is a viscous coupling.

8. The transfer case of claim 6 wherein said second clutch includes a thrust mechanism for exerting a clutch engagement force on said interleaved clutch plates having a magnitude which is proportional to a magnitude of said speed differential.

9. The transfer case of claim 8 wherein said second clutch includes a piston retained in a pressure chamber for applying said clutch engagement force on said interleaved clutch plates, and a pump for supplying fluid under pressure to said pressure chamber in response to the occurrence of said speed differential.

10. The transfer case of claim 9 further comprising sensors for detecting an operating characteristic of the vehicle and generating sensor signals in response thereto, and a controller for receiving said sensor signals and controlling fluid pressure supplied by said pump to said pressure chamber as a function of said sensor signals.

11. The transfer case of claim 8 wherein said second clutch includes an actuator for generating said clutch engagement force.

12. The transfer case of claim 11 further comprising sensors for detecting an operating characteristic of the vehicle and generating sensor signals in response thereto, and a controller for receiving said sensor signals and controlling said actuator as a function of said sensor signals.

13. A transfer case for use in a four-wheel drive vehicle having a power source and front and rear drivelines, comprising:

a housing;

an input shaft rotatably supported by said housing and driven by the power source;

a front output shaft rotatably supported by said housing and connected to the front driveline;

a rear output shaft rotatably supported in said housing and connected to the rear driveline;

a planetary gear assembly interconnecting said input shaft to said front and rear output shafts for delivering drive torque from the power source to the front and rear drivelines while permitting speed differentiation therebetween, said planetary gear assembly including first and second planetary gearsets having a common carrier assembly, said first planetary gearset including a first sun gear, a ring gear fixed to said housing, a first planet gear rotatably supported by said carrier assembly and meshed with said first sun gear and said ring gear, said second planetary gearset including a second sun gear fixed for rotation with said rear output shaft, a third sun gear fixed for rotation with said front output shaft, a second planet gear rotatably supported by said carrier assembly and meshed with said second sun gear, and a third planet gear rotatably supported by said carrier assembly and meshed with said third sun gear and said second planet gear;

a range sleeve coupled for rotation with said input shaft and movable between a high-range position coupling said carrier assembly for rotation with said input shaft, a low-range position coupling said first sun gear for rotation with said input shaft, and a neutral position uncoupling said input shaft from both of said carrier assembly and said first sun gear; and a biasing clutch operable for limiting relative rotation and regulating torque distribution between said front output shaft and said rear output shaft in response to relative rotation therebetween.

14. The transfer case of claim 13 further comprising a first synchronizer that is operably disposed between said input shaft and said carrier assembly for inhibiting movement of said range sleeve to said high-range position until speed synchronization is established therebetween, and a second synchronizer that is operably disposed between said input shaft and said first sun gear for inhibiting movement of said range sleeve to said low-range position until speed synchronization is established therebetween.

15. The transfer case of claim 13 wherein said biasing clutch is a multi-plate clutch assembly having a first set of clutch plates fixed for rotation with said rear output shaft, a second set of clutch plates fixed for rotation with said front output shaft and which are interleaved with said first set of clutch plates, and means for transferring drive torque from faster rotating clutch plates to slower rotating clutch plates in response to a speed differential between said front and rear output shafts when said speed differential exceeds a predetermined value.

16. The transfer case of claim 15 wherein said biasing clutch is a viscous coupling.

17. The transfer case of claim 15 wherein said biasing clutch includes a thrust mechanism for exerting a clutch engagement force on said interleaved clutch plates having a magnitude which is proportional to a magnitude of said speed differential.

18. The transfer case of claim 17 wherein said biasing clutch includes a piston retained in a pressure chamber for applying said clutch engagement force on said interleaved clutch plates, and a pump for supplying fluid under pressure to said pressure chamber in response to the occurrence of said speed differential.

19. The transfer case of claim 18 further comprising sensors for detecting an operating characteristic of the vehicle and generating sensor signals in response thereto, and a controller for receiving said sensor signals and controlling fluid pressure supplied by said pump to said pressure chamber as a function of said sensor signals.

20. The transfer case of claim 17 wherein said biasing clutch further includes an actuator for generating said clutch engagement force.

21. The transfer case of claim 20 further comprising sensors for detecting an operating characteristic of the vehicle and generating sensor signals in response thereto, and a controller for receiving said sensor signals and controlling actuation of said actuator as a function of said sensor signals.

* * * * *